United States Patent
Bond (10) Patent No.: US 7,811,089 B2
(45) Date of Patent: Oct. 12, 2010

(54) VEHICLE STEERING SENSING APPARATUS

(75) Inventor: Neville J Bond, Gisborne (AU)

(73) Assignee: Drag Tag Pty Ltd, Niddrie DC, Victoria (AU)

( * ) Notice: Subject to any disclaimer, the term of this patent is extended or adjusted under 35 U.S.C. 154(b) by 1470 days.

(21) Appl. No.: 11/195,755

(22) Filed: Aug. 3, 2005

(65) Prior Publication Data

US 2006/0078854 A1 Apr. 13, 2006

Related U.S. Application Data

(63) Continuation of application No. PCT/AU2005/000133, filed on Feb. 2, 2005.

(30) Foreign Application Priority Data

Feb. 3, 2004 (AU) .............................. 2004900513

(51) Int. Cl.
*G09B 9/04* (2006.01)
(52) U.S. Cl. .............................. 434/67; 434/66; 434/68; 434/69; 434/70
(58) Field of Classification Search ............. 434/28–71; 33/203.15, 203.18; 384/488; 356/139.09; 340/438–441
See application file for complete search history.

(56) References Cited

U.S. PATENT DOCUMENTS 4,910,717 A * 3/1990 Terry ........................... 367/99
5,519,489 A * 5/1996 McClenahan et al. .. 356/139.09
5,607,308 A * 3/1997 Copperman et al. ........... 434/62
6,123,547 A * 9/2000 Teresi ........................... 434/61
2002/0157470 A1 10/2002 Noetzel et al.

FOREIGN PATENT DOCUMENTS

JP  2004-028586  1/2004

OTHER PUBLICATIONS

International Search Report of PCT/AU2005/000133.

* cited by examiner

*Primary Examiner*—Xuan M Thai
*Assistant Examiner*—Timothy Musselman
(74) *Attorney, Agent, or Firm*—Pillsbury Winthrop Shaw Pittman LLP (57) ABSTRACT

A steering sensing apparatus for measuring steering actions of a driver of a motor vehicle for use in an apparatus for simulated driving of the vehicle in which the motor vehicle remains stationary. The apparatus includes two ultrasonic transducers which are mountable relative to a steerable wheel of the vehicle to each transmit an ultrasonic signal to a target location on the steerable wheel, which target locations are on the same side of and equally oppositely spaced from the centre of the steerable wheel along a generally horizontal diametrical line. Each transducer provides an output electrical signal representative of the magnitude of steering movements of the steerable wheel. The signal representative of the steering movements can be used in the apparatus for simulated driving to deflect computer driven virtual scenic imagery to simulate turning of the vehicle in synchronism with the steering actions of the driver.

7 Claims, 4 Drawing Sheets

VEHICLE STEERING SENSING APPARATUS

CROSS-REFERENCE TO RELATED APPLICATIONS

This is a Continuation of International Application No. PCT/AU2005/000133, filed on Feb. 2, 2005, which relies for priority upon Australian Patent Application No. 2004900513, filed on Feb. 3, 2004, the contents of both of which are incorporated herein by reference in their entireties.

TECHNICAL FIELD

The present invention relates to a motor vehicle steering sensing apparatus for measuring steering actions of a driver of the motor vehicle for use in apparatus for simulated driving of the vehicle. The apparatus for simulated driving of the motor vehicle may be for driver training or simulated racing as disclosed in the applicant's co-pending Continuation of International Application No. PCT/AU2005/000131, entitled "Apparatus for Simulated Driving of a Motor Vehicle," filed concurrently with the present application, the contents of which are incorporated herein by reference in its entirety.

BACKGROUND

The applicant's above mentioned concurrently filed co-pending International application discloses apparatus for simulated driving of a motor vehicle, the motor vehicle having at least one drive wheel and the apparatus including a support for rotatably supporting the drive wheel of the motor vehicle such that the motor vehicle remains stationary whilst a driver thereof controls the rotational speed of its drive wheel, a computer containing simulation software for generating virtual scenic imagery for a driver of the vehicle, and a visual display system having a viewing screen arrangement.

The support, the computer and the visual display system are operably interconnected for the simulation software to generate virtual scenic imagery on the viewing screen arrangement of the visual display system for viewing by a driver whilst the driver controls the rotational speed of the drive wheel, the virtual scenic imagery having a progression which is dependent upon the rotational speed of the drive wheel. The viewing screen arrangement of the visual display system, in use of a motor vehicle with the apparatus, includes a portion that extends across the front of and portions that extend respectively a distance along each side of the motor vehicle and the simulation software and visual display system are such as to generate virtual front and side scenic imagery for the driver on the viewing screen arrangement.

To increase the realism of a simulated driving session, the apparatus may include, in combination, a steering sensing arrangement for operable association with the vehicle steering for providing signals of steering actions by the driver which are inputted into the computer, the computer being programmed for the steering action signals to influence the simulation software such that the virtual scenic imagery is deflected in synchronism with the steering actions of the driver.

The present invention is a steering sensing apparatus as such which may be independently supplied for incorporation into apparatus for simulated driving of a motor vehicle, which apparatus may but need not be as in the applicant's above mentioned concurrently filed co-pending International application.

DISCLOSURE OF THE INVENTION

Accordingly, the present invention provides a steering sensing apparatus for measuring steering actions of a driver of a motor vehicle having a steerable wheel for use in apparatus for simulated driving of the motor vehicle, the apparatus including two transducers, each for transmitting a signal to a target and receiving a reflected signal from the target for providing an output electrical signal representative of the distance between the transducer and the target, and a support for mounting the transducers, wherein the transducers are mounted on the support in spaced apart relationship and are oriented such that in use each transducer transmits a signal to a target location on the steerable wheel which target locations are oh the same side of and are oppositely spaced from the centre of the steerable wheel whereby the output electrical signals of the two transducers are combinable to derive a signal representative of the magnitude of turning movements of the steering wheel about a generally vertical central axis through the steerable wheel for providing a measure of the steering actions of a driver of the motor vehicle.

Preferably the transducers are arranged on the support for the target locations to be substantially equally spaced from the centre of the steerable wheel along a generally horizontal diametrical line.

In order to cater for differently sized vehicles having differently sized steerable wheels, the transducers are preferably adjustably mounted on the support whereby their spacing may be varied, and/or their vertical positioning relative to the steerable wheel of a vehicle may be varied.

The transducers are preferably ultrasonic transducers.

The invention furthermore provides apparatus for simulated driving of a motor vehicle, the motor vehicle having at least one drive wheel and at least one steerable wheel, the apparatus including a support for rotatably supporting the drive wheel of the motor vehicle such that the motor vehicle remains stationary whilst a driver thereof controls the rotational speed of its drive wheel, a computer containing simulation software for generating virtual scenic imagery for a driver of the motor vehicle, and a visual display system having a viewing screen, wherein the support, the computer and the visual display system are operably interconnected for the simulation software to generate virtual scenic imagery on the viewing screen of the visual display system for viewing by a driver whilst the driver controls the rotational speed of the drive wheel, the virtual scenic imagery having a progression which is dependent upon the rotational speed of the drive wheel, further including a steering sensing apparatus as described above located for operable association with said at least one steerable wheel of the vehicle when the vehicle's at least one drive wheel is on the support, wherein the computer is programmed for the steering action signals to influence the simulation software such that the virtual scenic imagery on the viewing screen is deflected in synchronism with the steering actions of the driver.

The apparatus for simulated driving may be set up for driver training, in which case the simulation software is for driver training. The apparatus, if for driver training, may also include a motor vehicle that is secured in position on the support to ensure it remains stationary whilst its drive wheel rotates.

Preferably the support for the at least one drive wheel of the motor vehicle is a chassis dynamometer which includes a pair of rollers for supporting the drive wheel.

For a better understanding of the invention and to show how the same may be carried into effect, preferred embodiments thereof will now be described by way of non-limiting example only with reference to the accompanying drawings.

DETAILED DESCRIPTION OF PREFERRED EMBODIMENTS

Figure 1:
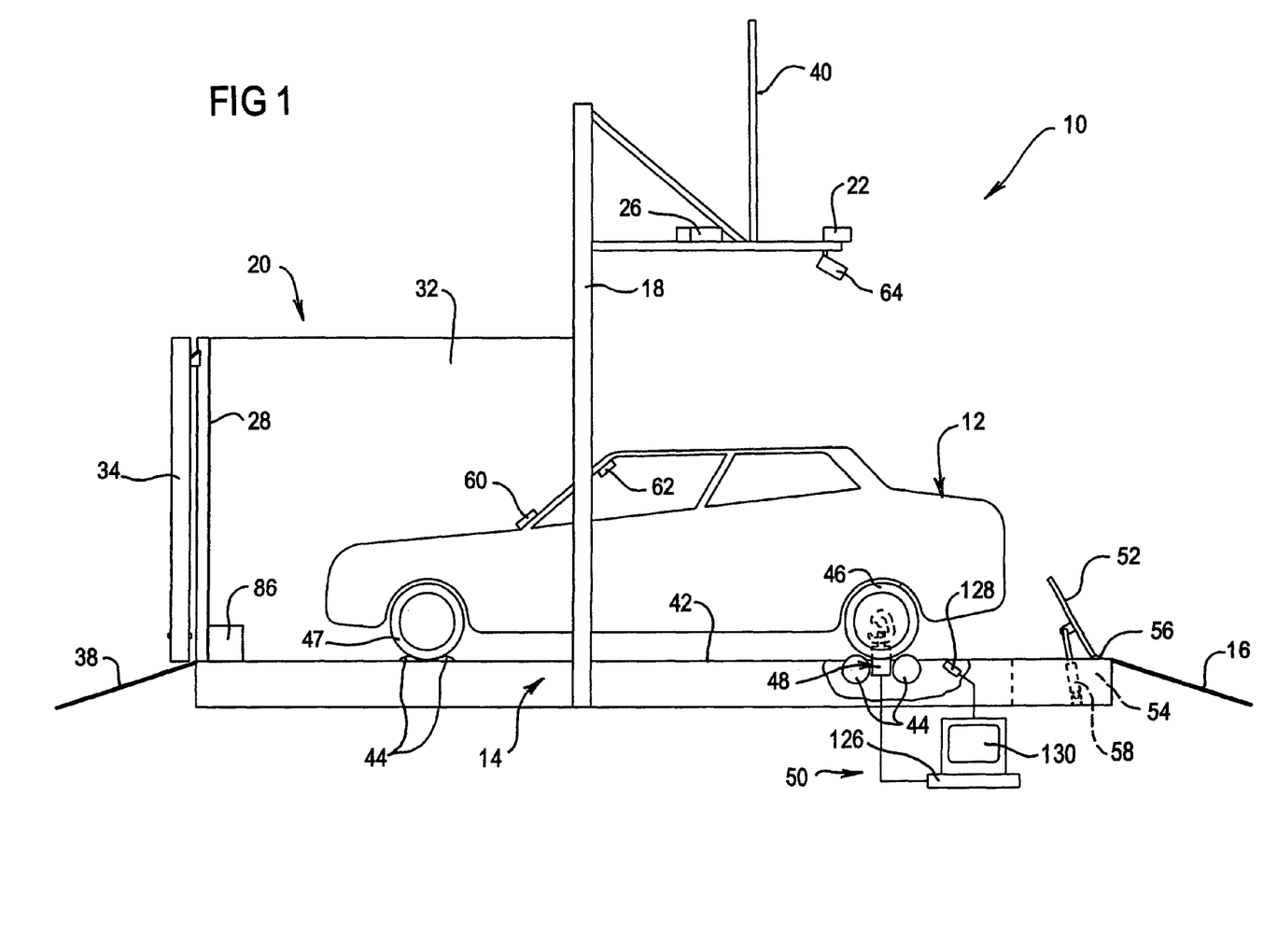
FIG. 1 is a schematic side elevation of apparatus for simulated driving of a motor vehicle.

FIG. 1 shows apparatus 10 for simulated driving of a motor car 12 whilst the car 12 remains stationary as comprising a chassis dynamometer 14 onto which the car 12 may be driven via an entry ramp 16 of the dynamometer 14. The chassis dynamometer 14 has a frame 18 associated therewith which carries other components of the apparatus 10. These other components include some portions of a viewing screen arrangement 20 and projectors 22, 24, 26 of a visual display system. The viewing screen arrangement 20 includes a front screen portion 28 that extends across the front of the motor car 12 and side screen portions 30, 32 that extend, respectively, a distance along each side of the motor car 12 (the side screen portion 30 has been omitted from FIG. 1 for clarity). Each side screen portion 30 and 32 is angled at 120° from the front screen portion 28. There are three projectors 22, 24, 26 of the visual display system mounted on the frame 18, each for projecting virtual scenic imagery onto a respective screen portion, that is projector 22 projects images onto opposite front screen portion 28, projector 24 projects onto opposite side screen portion 32 and projector 26 (which is hidden in the FIG. 2 view) projects onto opposite side screen portion 30. The projectors 22, 24, 26 may be Panasonic DLP™ Based Projectors No. PT-DS500E, which are provided with high quality wide-angle lenses for projecting onto the respective screen portions 28, 30 and 32.

The front screen portion 28 is mounted relative to two side structural poles 34 via actuators 36 (for example, pneumatic or hydraulic piston and cylinder rams) which are operative to raise the front screen portion 28 relative to the side screen portions 30 and 32 such that a car 12 and its driver, after having participated in a simulated driving session, can exit the apparatus 10 via an exit ramp 38 of the chassis dynamometer 14. The front screen portion 28 and actuator 36 are associated with the structural poles 34 such that the front screen portion 28, when it is to be raised, is first moved slightly away (for example, by a few mm only) from the adjacent edges of the side screen portions 30 and 32 such that as it is raised by the actuators 36, there is clearance between it and 35 the adjacent edges of the side screen portions 30 and 32.

For apparatus 10 for simulated racing, the frame 18 may also have mounted thereon another, larger, visual display screen 40 for an audience to view the simulated race.

The chassis dynamometer 14 has a platform 42 and includes supports in the form of pairs of rollers 44 for supporting and rotatably engaging the rear wheels 46, and front wheels 47 of the car 12, as is known for chassis dynamometers. The rear wheels 46 of car 12 are the driven wheels and the front wheels 47 are the steered wheels. Thus the rollers 44 provide for the car 12 to remain stationery whilst a driver thereof manipulates the car's controls, for example the gear change (if not automatic) and accelerator, to rotate the drive wheels 46 of the car 12 at speed (the apparatus 10 could be set-up for the drive wheels of a vehicle to be either the front or rear or both the front and rear pairs of the wheels). Rotation of the drive wheels 46 correspondingly rotates the associated pairs of rollers 44 via which various performance parameters of the car 12, such as acceleration, speed (RPM), horsepower, torque and time to travel over a set distance, can be measured. Measurement of such performance parameters may include varying the loads that are applied to the wheels 46 of the car 12 via the pairs of rollers 44, as is known for chassis dynamometers. Suitable chassis dynamometers, which are adjustable to accommodate different vehicles having different wheelbases (which adjustability is not illustrated in the figures) are obtainable from DYNA DYNAMICS of Industry Court, Lilydale, Victoria 3140, Australia.

The chassis dynamometer 14 also includes a securing mechanism 48 (which is only schematically illustrated in FIG. 1 and is located between each of the rollers of the rear pairs of rollers 44) for securing the car 12 to the dynamometer 12 once the car 12 is positioned on the pairs of rollers 44. Securing mechanism 48, in broad terms, is associated with a remotely operable control system (schematically represented by reference 50 in FIG. 1) and adjustable thereby to allow it to secure in place on the rollers 44 various different types and sizes of vehicles. It includes componentry for engaging a vehicle, such as a car 12, to hold the vehicle in place. The securing mechanism 48 is a safety feature that ensures the car 12 remains stationary whilst its wheels 46 are driven at speed on the rollers 44.

The chassis dynamometer 14 furthermore includes an arrangement for diverting exhaust gases from the car 12 away from the immediate vicinity of the apparatus 10. This arrangement comprises a deflector plate 52 for deflecting exhaust gases from the car 12 into an extraction duct 54. The duct 54 may include an extraction fan or other means (not shown in FIG. 1) for drawing the exhaust gases into the duct 54. The deflector plate 52 is hinged to the platform 42 of the dynamometer 14 at 56 and provides a cover for the duct 54 when the apparatus 10 is not in use. Deflector plate 52 is pivotal about its hinge 56 via an actuator 58 (which may be for example pneumatic or hydraulic) which is pivotally attached between the deflector plate 52 and the dynamometer 14.

A car 12 which is to be used for driving instruction or to participate in a simulated drag or circuit race may include a remotely readable device, such as a bar code 60 and/or an electronic device 62, for example a "smart card" or other electronic tag-like device, which contains data about the car 12, the purpose and functioning of which will be described in more detail hereinbelow. A reader/transmitter 64 is mounted on frame 18 (near projector 22) for operation/co-operation with bar code 60 and/or electronic device 62.

Figure 3:
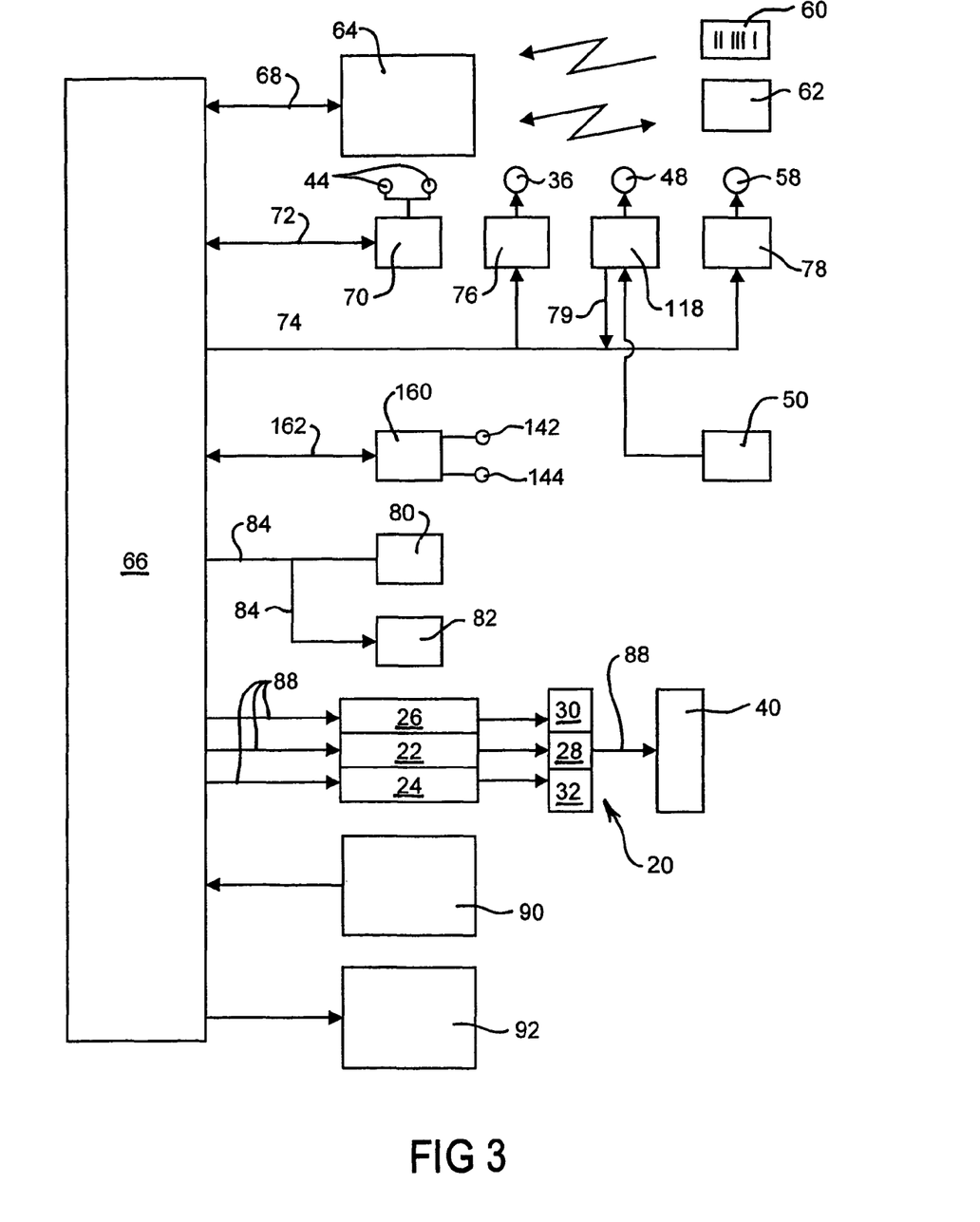
FIG. 3 is a block diagram showing operable associations of control and display components of apparatus as in FIGS. 1 and 2.

With reference to FIG. 3, the apparatus 10 for simulated driving includes a computer 66 which controls the various components of the apparatus 10 and contains the driving simulation software. The reader 64 (which may be combined with a transmitter) for reading the remotely readable bar code device 60 and/or electronic device 62 included in or on the car 12 is connected to computer 66 via a data link 68. Relevant data about car 12 is acquired by reader 64 from bar code 60 or electronic device 62 and inputted to the computer 66 over data link 68. A transmitter is preferably combined with the reader 64 for transmitting data from the computer 66 to the device 62 to update information about the car 12 that is stored by the electronic device 62. Such transmitted information may be, for example, data of the car's performance in a simulated race.

Each pair of rollers 44 of the chassis dynamometer 14 is associated with a brake unit 70 (also known as a "retarder"—only one of which is illustrated in the FIG. 3 schematic) and brake units 70 are operatively connected to computer 66 as indicated by data link 72 (as is known, an analogue to digital interface would be associated with each brake unit 70). There is data flow from computer 66 to brake units 70 to vary loads applied to the drive wheels 46 of a car 12 via the pairs of rollers 44 and also data feed back from the brake units 70 to the computer 66 from which relevant performance parameters of the car 12 are derivable, as is known for chassis dynamometers. The computer 66 also controls operation of the actuators 36 for raising the front screen portion 28 and the actuator 58 for deflector plate 52. Thus a signal line 74 from computer 66 is connected to respective converter/drivers 76 and 78 for operating respectively, the rams 36 for raising the front screen portion 28, and the actuator 58 for the deflector plate 52. The securing mechanism 48, which includes at least one actuator 118, is operated by the remotely operable control system 50. Note that reference 118 in FIG. 3 only schematically represents the actuator requirements for securing mechanism 48 in that multiple actuators may be involved to provide a range of movements, for example along three orthogonal axes, for the securing mechanism 48. A safety interlock signal over line 79 from mechanism 48-76 may be connected to computer 66 (for example via signal line 74) to prevent operation of the dynamometer 14 until the vehicle 12 has been secured thereon. Additionally, computer 66 controls the on-off operation of a blower fan 80 and an exhaust gas extraction fan 82 in duct 54 via a signal line 84. Blower fan 80 (not illustrated in the other figures) is provided to provide a cooling air flow to the front of the car 12 through apertures 86 in side screen portions 30 and 32 (see, for example, FIGS. 1 and 2).

Computer 66 also operates the three projectors 22, 24, 26 of the visual display system for viewing screen arrangement 20 and, if provided, screen 40, as indicated by data links 88. The computer 66 will also typically include a data entry facility, such as a key board or touch screen 90 and an output device such as a printer 92.

Figure 2:
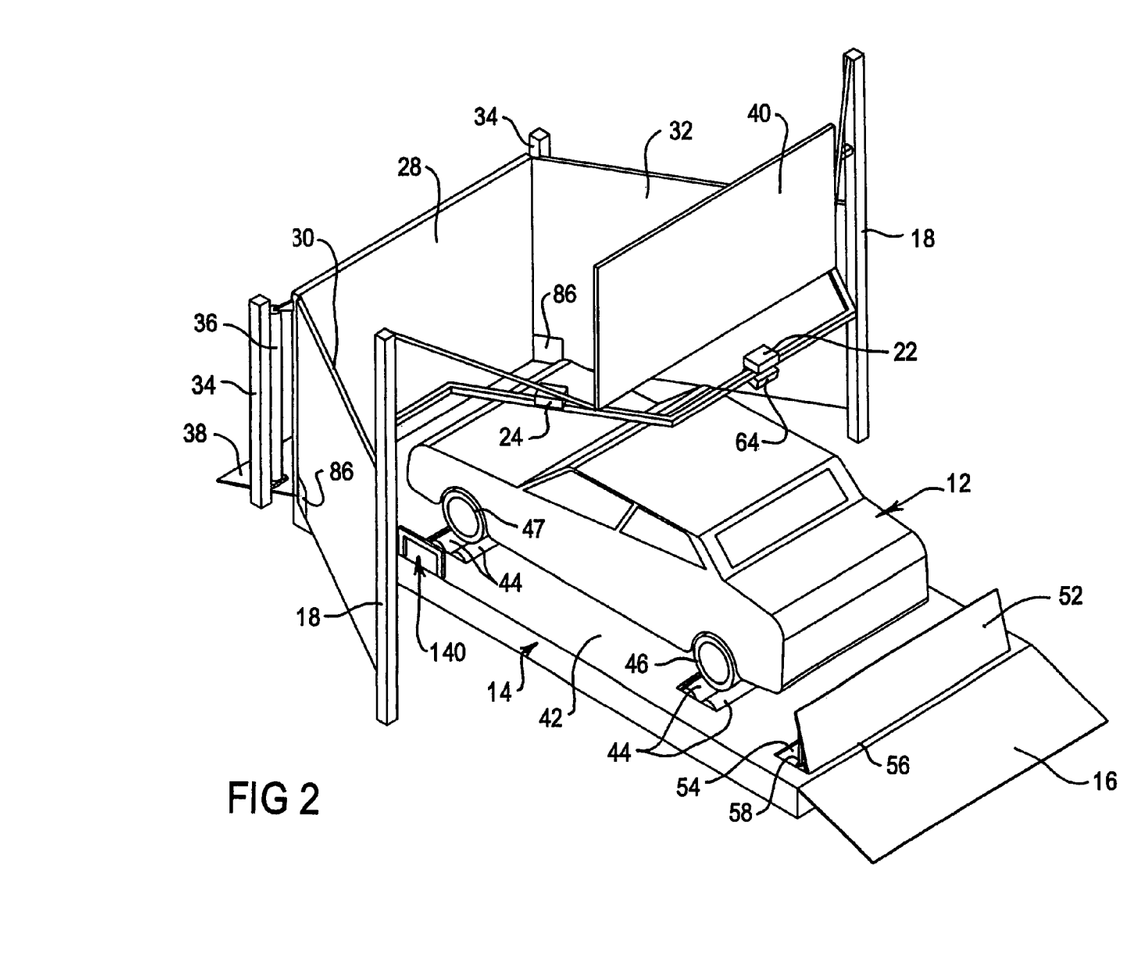
FIG. 2 is a schematic isometric view of the apparatus of FIG. 1 that includes a steering sensing apparatus according to an embodiment of the present invention.

The apparatus 10 also includes a steering sensing apparatus 140 according to an embodiment of the present invention. This apparatus includes a pair of transducers 142, 144, for measuring steering actions of a driver of a motor vehicle on the driving simulation apparatus 10. The steering sensing apparatus 140 is preferably locatable on the dynamometer 14 adjacent a steered wheel 47 of the motor car 12, for example in FIG. 2 it is shown adjacent the left front wheel 47 of the motor car 12 (note that the steering sensing arrangement 140 is shown in FIGS. 2, but omitted from FIG. 1 for clarity).

Figure 4:
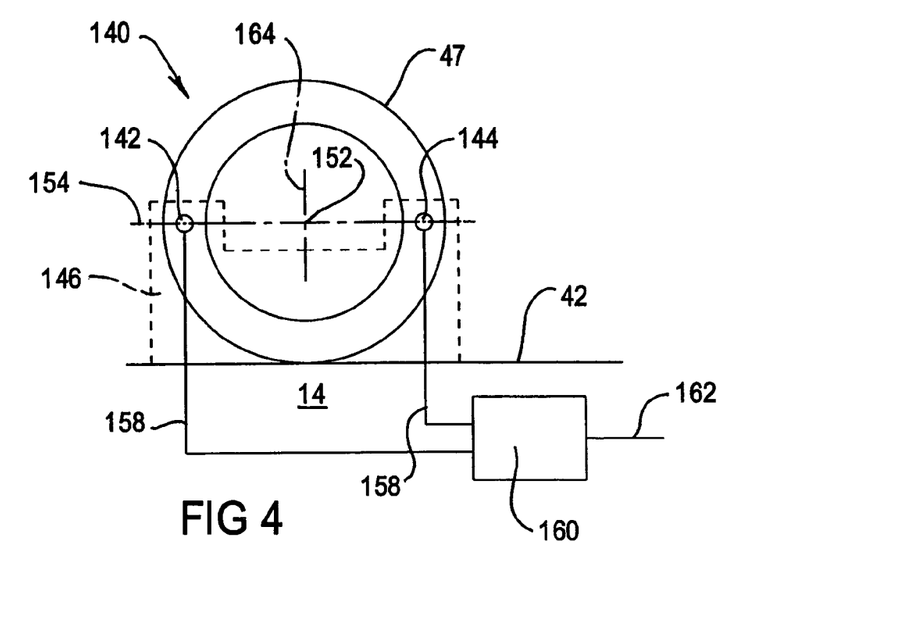
FIG. 4 is a schematic side view of a steering sensing apparatus for measuring steering actions of a driver of a motor car, according to an embodiment of the invention, for use in apparatus as in FIGS. 1 and 2.
Figure 5:
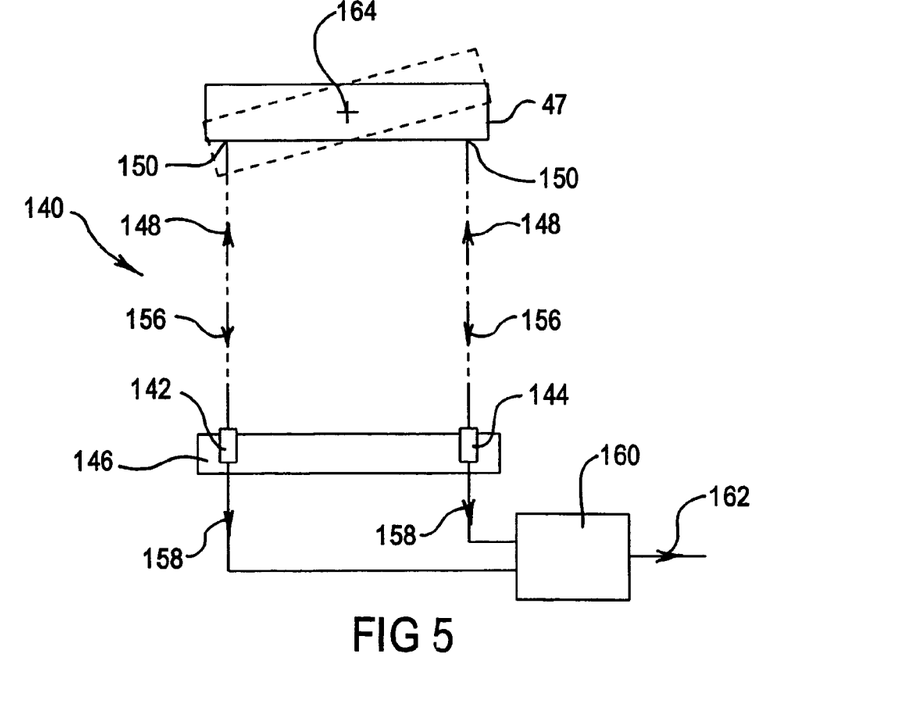
FIG. 5 is a schematic plan view-of the steering sensing apparatus of FIG. 4.

With reference to FIGS. 4 and 5, the steering sensing arrangement 140 includes two ultrasonic transducers 142, 144 and a support 146 therefore. The support 146 is locatable on platform 42 of dynamometer 14 such that the two spaced transducers 142, 144 which it mounts, will each transmit an ultrasonic signal 148 to a target location 150 on the steerable wheel 47. The target locations 150 are on the same side of steerable wheel 47 and are oppositely spaced from the centre 152 of the wheel 47, preferably they are substantially equally spaced from the centre 152 along a generally horizontal diametrical line 154. Reflected ultrasonic signals 156 from the target locations 150 are received by the transducers 142, 144 for the transducers to each provide an output electrical signal 158 representative of the distance between the transducer 142 or 144 and its target location 150 on the steerable wheel 47. The output electrical signals 158 of the two transducers 142 and 144 are suitably amplified and combined, for example subtracted, via appropriate electronic circuitry 160 to derive an electrical signal as indicated by the arrowhead on signal line 162 representative of the magnitude of turning movements of the steered wheel 47 about a generally vertical axis 164 through the centre 152 of the wheel 47 (and thus of the steering movements of the driver) which is inputted to the computer 66. It can be seen from FIG. 5 that the above described and illustrated positioning of the two ultrasonic transducers 142, 144 relative to the steerable wheel 47, on subtraction of the two electrical output signals 158, provides an output signal 162 representative of only magnitude changes in the rotation of wheel 47 about the vertical axis 164. By setting the transducers 142, 144 at a suitable distance from the tyre wall of wheel 47, the target locations 150 can be made such that an average of the tyre axial portion is measured with a minimum of interference from tyre runout, dirt, raised logos etc on the tyre surface. A motor car 12 is allowed some lateral motion whilst being driven when supported on the rollers 44 and by using the two transducers 142, 144, such lateral motion is also compensated for in the output electrical signal 162. Final filtering of the signal 162 to remove any remaining jitter or other noise is done in software in computer 66. The ultrasonic transducers 142, 144 may be 'BANNER' brand model UGUAGE transducers. Other types of transducers may alternatively be used, for example laser or radio wave (eg. microwave) based transducers.

FIG. 3 illustrates the connection of the transducers 142, 144 and electronic processing circuitry 160 to the computer 66. The signal on line 162 of steering movements is utilized by the simulation software to deflect the virtual scenic imagery on viewing screen arrangement 20 (that is, the imagery on all of screen portions 28, 30 and 32) in synchronism with the steering movements of the driver thereby increasing the realism of the "surrounding" virtual reality environment.

The mounting of the transducers 142, 144 on support 146 is preferably adjustable such that the spacing between the transducers 142, 144 can be altered to suit differently sized steerable wheels 47 as may be required for some motor vehicles, also the height of the transducers 142, 144 is adjustable relative to the platform 42 of dynamometer 14 for the same reason. Also for apparatus 10 that includes a steering sensing arrangement 140, it is preferred that the steerable wheels 47 not be supported on the rollers 44 because this detracts from the "natural feel" of the steering. Thus a platform or swivel plate (not shown) may be placed over the rollers 44 on which the steerable wheels 47 would otherwise rest to provide a flat surface for the steerable wheels 47. Otherwise a chassis dynamometer 14 that provides rollers 44 only for the rear driven wheels 46 of a front wheel steering motor vehicle may be used.

A steering sensing arrangement 140 as described which remotely senses steering actions and thus requires only minimal or no human operator involvement to set it ready for a particular vehicle adds to the efficiency of operation of the apparatus 10 as the turn around time for each vehicle is minimised.

The securing mechanism 48 (comprising a vehicle engaging component, and actuators—as represented by reference 118 on FIG. 3) is remotely operable by a control system 50 (schematically represented by reference 50 on FIGS. 1 and 3 but not shown on the other Figs). The control system 50 comprises operating switches in an operator's console or booth 126 (schematically shown only in FIG. 1) located for example beside the chassis dynamometer 14 for controlling the operation of the actuators. The control switches may be "joystick" type switches for operating a pneumatic system for powering the actuators and a respective "joystick" type switch may be provided for operating each respective actuator of the securing mechanism 48. The dynamometer 14 also includes a video monitoring system (schematically illustrated only in FIG. 1) comprising video cameras 128 located to view the operation of the vehicle securing mechanism 48 and display the movement of at least the vehicle engaging component and possibly also the actuators on a video screen 130 located in the operator's console or booth 126 for an operator to view such movement as she/he operates the switches of the control system 50 to move the vehicle engaging component as desired. Skilled persons will understand that the securing mechanism 48 must have adequate structural integrity to accommodate the loading and forces to which they will be subjected.

Operation of the apparatus 10 for simulated driving will now be described.

Prior to the car 12 being driven onto the chassis dynamometer 14, the racing simulator 10 will be set up such that the front screen portion 28 is in its lowered position, the securing mechanism 48 will be in an inoperative position and the deflector plate 52 will be closed. Also the pairs of rollers 44 will be braked to effectively lock them to allow car 12 to be driven onto them. Plates (not shown) that can be raised or lowered by an operator may be located between each roller 44 of each pair of rollers 44. When such plates are in their raised position, a motor car 12 can be readily driven into position on the dynamometer 14 without having to go over the 'humps' of the rollers 44. When the car 12 is correctly positioned, the plates can be lowered to bring its wheels 46, 47 into contact with the rollers 44 for the car 12 to be supported thereon. As the car 12 approaches the chassis dynamometer 14, its bar code device 60 or drag tag 62 is read by reader 64 for computer 66 to initiate adjustment of the dynamometer 14 to space the pairs of rollers 44 to suit the wheelbase of the car 12. Once the car 12 has been driven onto the pairs of rollers 44, if the car 12 is authorized for a race in the racing simulator 10, the operator in console 126 operates the control system 50 for the mechanism 48 to secure the car 12 in position. An option for the securing mechanism 48 is to provide a facility (not shown) near the entry ramp 16 for a driver of the car 12 to pre-select the hold-down pressure that will be applied by the actuators 118 of the securing mechanism 48. The hold-down pressure may be between about 2 to 8 bar. This gives the driver the option of selecting a greater pressure to give better traction but at the expense of available horsepower, as opposed to less pressure for greater available horsepower but a higher likelihood of wheel spin on the rollers 44. The computer 66 is then further initiated to set up the racing simulator 10 for the car 12. This may be in accordance with data about the car 12 that has been acquired from a "drag-tag" 62 via the reader/transmitter 64. Thus the computer 66 transmits appropriate signals on signal line 74 for actuator 58 to raise the deflector plate 52. The brake unit(s) 70 may also be conditioned via a signal over line 72 to impose a certain load via roller pairs 44 to suit the car 12 for the race simulation. For example, a certain "rolling resistance" may be required. The racing simulator 10 is now conditioned or set up for the simulated drag race to begin.

Computer 66 includes simulation software, for example for a ¼ mile drag race, which is automatically initiated as soon as the racing simulator 10 is set up for the drag race to begin. This software via the visual display system displays a lighting sequence on front screen portion 28 for the driver to start, as is known for real ¼ mile drag racing. On receiving the final start light, the driver presses on the accelerator of car 12 as though commencing a real race and the virtual scenic imagery display on screen arrangement 20 progresses in dependence upon the speed of the wheels 46 via feedback from the pairs of rollers 44. The simulation software is such as to drive the computer's image generator and thus the projectors 22, 24, 26 to display on the viewing screen arrangement 20 realistic three-dimensional virtual front (on front screen portion 28,) and side (on side screen portions 30 and 32) scenic imagery of front-on and passing scenery as though the driver was racing the car 12, which virtual scenic imagery has a progression that is synchronised to the speed of the drive wheels 46 of car 12 as measured via the pairs of rollers 46. Thus all speed changes via acceleration, gear changes and braking are sensed and fed to computer 66 to control the progress of the virtual scenic imagery. The driver of the car 12, with his/her eyes focussed. On the front screen portion 28 of the viewing screen arrangement 20 (which may be quite large, for example each screen portion may be 4.5 m×3.375 m to render greater realism) experiences the sensation of participating in a real drag race in his/her own car 12 whilst the car 12 remains stationary and is secured in position on the chassis dynamometer 14 by securing mechanism 48.

Simultaneously with commencement of the simulated race, the computer 66 initiates operation of the blower fan 80, the outlets 86 for which are located for air to blow onto the front of the car 12 to cool its engine for the duration of the simulated race. The extraction fan 82 in the exhaust gas extraction duct 54 is also switched on at the same time as the blower fan 80 by the computer 66.

At the end of the simulated ¼ mile drag race, the time taken for the driver/car 12 combination to complete the race is displayed on front screen portion 28 and transmitted by reader/transmitter 64 to the "drag-tag" 62 to be stored by the "drag-tag" 62. Thus a "drag-tag" 62 can store data of a race number and the time for that race such that the driver can have a history of his/her times over a series of simulated races displayed on the front screen portion 28 at the commencement and end of a simulated drag race.

After a short display of the driver/car 12 race time on front screen portion 28, the operator operates the control system 50 to release the securing mechanism 48, and the computer 66 initiates closure of the deflector plate 52, raising of the front screen portion 28 and locking of the pairs of rollers 44 whereupon the driver is able to drive car 12 forwardly off the chassis dynamometer 14 over its exit ramp 38. The race simulator 10 is thus ready to receive another vehicle via its entry ramp 16.

The apparatus 10 may also be used for simulated circuit races when it includes the steering sensing apparatus 140. This will differ from the above description about simulated drag racing in that additionally the steering sensing apparatus 140 is operated to input the driver's steering actions during a simulated circuit race into the computer 66 for the simulation software to drive the computer's image generator and thus the projectors 22, 24, 26 to laterally deflect the virtual scenic imagery on the viewing screen arrangement 20 in synchronism with the steering actions of the driver. That is, the virtual scenic imagery progresses in real time in synchronism with both the power applied by the driver to the drive wheels 46 and with the driver's steering actions as measured by apparatus 140 from movements of one of the steerable wheels 47. Such progression involves a virtual road ahead seemingly moving towards and under the car to simulate forwards speed of the car and the virtual road or other imagery deflecting laterally to simulate the car turning. The screen arrangement 20 effectively provides a "surround" triple-screen display enclosure which presents a field of view for the driver in excess of 200 degrees horizontally, which in combination with multi-perspective, high resolution travelling imagery (created by the simulation software and visual display system) creates for the driver of car 12 an illusion of his/her own personal virtual reality environment, which continually flows through changing perspectives generated by the driver's own actions of application of power to the car 12 and steering it.

For the apparatus 10 to be used for circuit racing, the steered wheels 47 of the car 12 are preferably not supported by the rollers 44, instead they may be supported on a support plate between or over the rollers 44 (as mentioned above). Alternatively the dynamometer 14 may be of a type that includes rollers 44 for supporting only the drive wheels 46 of a car 12 and not its steered wheels 47.

The apparatus 10 may be used for driver training instead of circuit racing (in which case the simulation software need not provide the start procedures for drag or circuit racing as described above). Apparatus 10 may also be provided for driver training which already has a car 12 secured in position on the dynamometer 14, thus eliminating the need for a learner driver to have his/her own vehicle and rendering unnecessary the use of a bar code device 60 or 'drag-tag' 62. Generally, apparatus 10 that is for driver training will be set up to accommodate rear wheel drive vehicles with front wheel steering.

The apparatus 10 preferably additionally includes sound and lighting devices (not shown) for generating sounds and lighting effects onto a car 12 during a simulated driving session to increase the sense of realism of the simulated driving session. Such sound and lighting effects are preferably coordinated with effects on the virtual scenic imagery on the screen arrangement 20, that is, for example for night driving, street lighting effects can be provided, or for a car 12 that enters a simulated skid a sound of squealing tyres can be generated. It is well within the skill of a programmer to provide simulation software for driving such sound and lighting devices in synchronism with the progression of the virtual scenic imagery.

The apparatus 10 also allows for advertising sponsorships by way of the simulation software including programs for displaying appropriate advertising signs etc. on the viewing screen arrangement 20 before during or after a simulated driving session. For example, during a simulated race, the advertisements could appear as road side signs that the driver passes.

Various modifications within the scope of the invention, other than those already described, may be made in respect of the apparatus 10 as described hereinbefore. For example, a simulated race could be other than a circuit race, for example it could be for simulated rally driving. Also the simulation software is preferably such that operator input to the computer 66 via data entry facility 90 is possible to present the driver with unexpected driving situations, for example to put the vehicle into a simulated skid, which the driver is expected to recover from.

The dynamometer may include less than the four pairs of rollers 44, for example it may include only two pairs of rollers to rotatably support the drive wheels of a vehicle, be they the front or rear pair of wheels. It is also within the scope of the invention to provide a race simulator for two wheeled vehicles such as motorcycles, in which case the dynamometer component may comprise a support platform that includes rollers for the front or rear wheel or both wheels of the motorcycle, or a rotatable platform type of movable support for both wheels.

The steering sensing apparatus 140 may be used in apparatus for simulated driving which is different to the apparatus 10 as described above. For example, instead of a triple viewing screen arrangement 120, a visual display system that has a single front screen and a single projector therefor may be used. Such a visual display system can convey sufficient virtual realism for the driver as to be attractive to potential customers for use of the driving simulation apparatus.

The invention described herein is susceptible to variations, modifications and/or additions other than those specifically described above and it is to be understood that the invention includes all such variations, modifications and/or additions which fall within the scope of the following claims.

The invention claimed is:

1. An apparatus for simulated driving of a motor vehicle, the motor vehicle having at least one drive wheel and at least one steerable wheel, the apparatus comprising:

a vehicle support for rotatably supporting the drive wheel such that the motor vehicle remains stationary whilst a driver controls the rotational speed of the drive wheel, a computer containing simulation software for generating virtual scenic imagery for the driver of the motor vehicle, a visual display system having a viewing screen, wherein the vehicle support, the computer and the visual display system are operably interconnected for the simulation software to generate the virtual scenic imagery on the viewing screen of the visual display system for viewing by the driver whilst the driver controls the rotational speed of the drive wheel, the virtual scenic imagery having a progression which is dependent upon the rotational speed of the drive wheel, a steering sensing apparatus comprising two transducers, each for transmitting a signal to a target, receiving a reflected signal from the target, and for providing an output electrical signal representative of the distance between the transducer and the target, and a transducer support on which the transducers are mounted in spaced apart relationship and are oriented such that in use each transducer transmits a signal to a target location on the steerable wheel, which target locations are on the same side of and are oppositely spaced from the centre of the steerable wheel, and electronic circuitry for receiving the output electrical signals of the two transducers and combining the electrical signals to derive a signal representative of the magnitude of steering movements of the steerable wheel about a generally vertical central axis through the steerable wheel thereby providing a measure of the steering actions of the driver of the motor vehicle, wherein the steering sensing apparatus is operably associated with the steerable wheel when the vehicle's at least one steerable wheel is on the vehicle support, wherein the computer is programmed for the steering action signals also to influence the simulation software such that the virtual scenic imagery on the viewing screen is deflected in synchronism with the steering actions of the driver.

2. The apparatus for simulated driving as claimed in claim 1 wherein the simulation software is for driver training and the apparatus includes a motor vehicle that is secured in position on the vehicle support to ensure that it remains stationary whilst the drive wheel rotates.

3. The apparatus as claimed in claim 1 or claim 2 wherein the vehicle support for rotatably supporting the drive wheel of the motor vehicle is a pair of rollers of a chassis dynamometer.

4. The apparatus as claimed in claim 1 wherein the transducers are arranged on the support for the target locations to be substantially equally spaced from the centre of the steerable wheel along a generally horizontal diametrical line.

5. The apparatus as claimed in claim 1 or claim 4 wherein the transducers are ultrasonic transducers.

6. The apparatus as claimed in claim 1 wherein the transducers are adjustably mounted on the support whereby their spacing is variable for steerable wheels of differing diameters.

7. The apparatus as claimed in claim 6 wherein the transducers are also mounted on the support to be adjustable vertically for different sized steerable wheels.

* * * * *